United States Patent [19]
Mahvi et al.

[11] Patent Number: 5,230,450
[45] Date of Patent: * Jul. 27, 1993

[54] INFANT CARE BAG

[76] Inventors: A. Pascal Mahvi; Caryl L. Mahvi, both of 17 Montpellier, Newport Beach, Calif. 92660

[*] Notice: The portion of the term of this patent subsequent to Nov. 5, 2008 has been disclaimed.

[21] Appl. No.: 698,609

[22] Filed: May 10, 1991

Related U.S. Application Data

[63] Continuation of Ser. No. 421,530, Oct. 13, 1989, Pat. No. 5,062,557.

[51] Int. Cl.⁵ ............................................. A45F 4/04
[52] U.S. Cl. .................................... 224/153; 224/155; 190/8; 190/108; 190/110; 220/23.4; 297/129; 294/141
[58] Field of Search ............... 224/151, 153, 155, 156; 294/141; 206/372, 373, 547; 190/1, 8, 108, 110, 111, 125; 150/106; 383/110; 220/23.4, 23.83; 297/129

[56] References Cited

U.S. PATENT DOCUMENTS

| D. 323,426 | 1/1992 | Mahvi et al. | D3/31 |
|---|---|---|---|
| 21,007 | 7/1900 | Elcock | 238/127 |
| 2,399,787 | 5/1946 | Clerc | 190/1 |
| 2,473,079 | 6/1949 | Thompson | 297/129 |
| 2,598,385 | 5/1952 | Hume | 190/8 |
| 3,120,404 | 2/1964 | Bramming | 297/118 |
| 3,122,225 | 2/1964 | Ward | 190/108 |
| 3,625,405 | 12/1971 | Farber | 224/32 A |
| 3,696,850 | 10/1972 | Rosenblum | 190/108 |
| 3,830,348 | 8/1974 | Ohyama | 190/108 X |
| 3,902,640 | 9/1975 | Geiben | 224/215 |
| 4,236,657 | 12/1980 | Brunton | 224/153 |
| 4,350,361 | 9/1982 | Fujii | 280/289 A |
| 4,367,829 | 1/1983 | Kusz | 224/31 |
| 4,383,625 | 5/1983 | Kiang | 224/39 |
| 4,410,116 | 10/1983 | Mattei | 224/40 |
| 4,666,071 | 5/1987 | Irwin et al. | 224/39 |
| 4,673,117 | 6/1987 | Calton | 224/151 |
| 4,676,548 | 6/1987 | Bradbury | 224/155 X |
| 4,679,242 | 7/1987 | Brockhaus | 383/16 X |
| 4,693,345 | 9/1987 | Mittelmann | 190/108 |
| 4,738,340 | 4/1988 | Crespi | 190/18 R |
| 4,781,277 | 11/1988 | Lim | 224/151 X |
| 4,792,024 | 12/1988 | Morton et al. | 224/151 X |
| 4,819,793 | 4/1989 | Willard et al. | 383/110 X |
| 4,883,207 | 11/1989 | McArthur | 224/153 |
| 4,886,150 | 12/1989 | Fitzsimmons | 190/1 |
| 4,923,104 | 5/1990 | Rice et al. | 224/155 |
| 4,929,094 | 5/1990 | Becker | 383/110 X |
| 4,988,216 | 1/1991 | Lyman | 383/110 X |
| 5,062,557 | 11/1991 | Mahvi et al. | 224/153 |

FOREIGN PATENT DOCUMENTS

| 210953 | 6/1987 | European Pat. Off. . | |
| 2933595 | 4/1979 | Fed. Rep. of Germany . | |
| 370272 | 2/1988 | Fed. Rep. of Germany . | |
| 92053 | 7/1958 | Norway | 383/110 |
| 2128471 | 5/1984 | United Kingdom | 224/155 |
| 2184002 | 6/1987 | United Kingdom . | |

OTHER PUBLICATIONS

Article, "Thinsulate"-3M Tote-1 page, no date.
"The Family Travel Bag"-Family TravelGear, 1 page, no date.
Eagle Creek Diaper Pack-Catalog-1 page, no date.
"Baby in a Backpack" Article from *Baby Talk*, Jun. 1990-3 pages.

*Primary Examiner*—Henry J. Recla
*Assistant Examiner*—Glenn T. Barrett
*Attorney, Agent, or Firm*—Stetina and Brunda

[57] ABSTRACT

An infant care bag for storing bottles, diapers, Wet Wipes, and other infant care supplies comprises a primary bag section and a removable auxiliary bag section is disclosed. The primary bag section can be worn as a backpack with or without the removable auxiliary bag section. The primary bag section stores a variety of infant care supplies and perishable food items and can be used as a booster chair for dining. The removable auxiliary section provides additional storage space and has a compartment for storing a changing pad. The infant care bag is constructed of a fabric coated extruded plastic framework. A second embodiment disclosed in the infant care bag is fabricated from vacuum formed plastic. The infant care bag is therefore lightweight and easy to clean.

13 Claims, 5 Drawing Sheets

INFANT CARE BAG

This application is a continuation of application Ser. No. 07/421,530, filed Oct. 13, 1989, now U.S. Pat. No. 5,062,557.

FIELD OF THE INVENTION

The present invention relates generally to infant care apparatus, and more particularly to an infant care bag for storing bottles, diapers, and other infant care supplies. The infant care bag comprises a primary bag section and a removable auxiliary section. The primary bag section can be worn as a backpack with or without the removable auxiliary bag section. A removable shoulder strap permits the infant care bag to be carried in the fashion of a common shoulder bag. The primary bag stores a variety of infant care supplies and perishable beverage and food items. It can also be used as a booster chair for infant feeding. The removable auxiliary section provides additional storage space and may be used separately from the primary bag section. The infant care bag may be constructed of vinyl or nylon formed about an extruded plastic framework, or may be constructed of vacuum formed plastic. It is therefore lightweight and easy to clean.

BACKGROUND OF THE INVENTION

Storage cases for carrying and storing infant care supplies are well known. Diaper bags are perhaps the most common of such apparatus. A diaper bag is typically a fabric bag for storing both clean and soiled diapers, bottles, tissues, hand towels, and the like. Some diaper bags have separate compartments for bottles. Some diaper bags also provide for the storage of a changing pad.

Such apparatus simplify the transportation and storage of infant care supplies, however they do not provide for the cooling of beverage and food items or the organization of a very large variety of infant care supplies.

Coolers are commonly used to store food and beverage items which must be kept at a low temperature to prevent spoilage. Such coolers do not readily accommodate the storage of a large variety of non-food items.

Booster chairs are commonly required when both dining out and eating at home to elevate an infant to a height where the infant can eat food placed upon a table.

Changing pads are often carried by persons with infants to provide a clean, soft surface upon which the infant's diaper may be changed. The changing pad keeps the infant and new diaper clean if changing occurs upon the ground, for example. The changing pad keeps the infant and soiled diaper from soiling other items, such as a bed or sofa, upon which changing may also occur.

In the prior art the diaper bag, cooler, booster chair, and changing pad are all separate items which must be carried and stored as separate items. It is difficult, if not impossible for a single individual to carry all of these items simultaneously. Storage of each of these items in a common area, the trunk of a car for example, is difficult because of the amount of space required. It would therefore be desirable to provide a single apparatus which would provide for the transportation and storage of infant care supplies, perishable food and beverage items and which could also be used as a booster seat. As such, although the prior art has recognized the need for the individual items, no means has been provided whereby each of these items may be integrated into a single unit for convenient transportation and storage.

SUMMARY OF THE INVENTION

The present invention specifically addresses and alleviates the above-mentioned deficiencies associated in the prior art. More particularly, the present invention comprises an infant care bag for storing baby bottles, beverages, perishable food items, diapers, wet wipes, and other infant care supplies. The infant care bag can be separated into a primary bag section and a removable auxiliary bag section. The primary bag section can be worn as a backpack with or without the auxiliary removable section. The primary bag section is specifically formed to store a variety of commonly used infant care supplies and perishable beverage and food items and can be used as a booster chair for infant feeding. The removable auxiliary section provides additional storage space and can be used independently of the primary bag section.

The primary bag section and the removable auxiliary section contain a plurality of compartments which are specifically sized to store particular infant care items. For instance, compartments within the cooler are sized to store baby bottles without permitting them to overturn. Also, the left and right rear compartments of the primary bag are specifically sized to store diapers and Baby Fresh (a registered trademark of Scott Paper Company) premoistened tissues respectively. The various infant care items fit snugly into their respective compartments, thus minimizing wasted space and providing the best possible protection to the contents of the infant care bag. The infant care bag can be constructed of a vinyl or nylon covered extruded plastic framework, or can be constructed of vacuum formed plastic. It is therefore lightweight and easy to clean.

After the infant matures to a point where a large variety of infant care supplies are no longer required, then the infant care bag can be used to store and transport other items. The infant care bag is ideal for day outings such as trips to the beach, sporting events, and picnics. It can be used to carry such items as camera equipment, clothing, food, and soft drinks. Therefore, the infant care bag is not limited to use with infant care supplies.

These, as well as other future advantages will be more apparent from the following description and drawings. It is understood that changes in the specific structure shown and described may be made within the scope of the claims without departing from the spirit of the invention.

BRIEF DESCRIPTION OF THE DRAWINGS

FIG. 5 is a sectional plan view of the primary bag section of FIG. 4 showing the webbing used for the storage of an umbrella or the like;

DETAILED DESCRIPTION OF THE PREFERRED EMBODIMENT

The infant care bag of the present invention is illustrated in FIGS. 1-13 which depict two presently preferred embodiments of the invention.

Referring now to FIGS. 1-10, the infant care bag is comprised of a primary bag section 10 and a removable auxiliary bag section 12, each having a plurality of closable compartments formed therein. First 14 and second 16 handles permit the infant care bag to be conveniently carried by hand. A shoulder strap 18 allows the infant care bag to be carried from the shoulder in a fashion similar to that of a common ladies' shoulder bag. First 20 and second 22 adjustable straps permit the infant care bag to be carried as a backpack, thus freeing the hands to hold and care for the infant. The straps 20 and 22 can be stowed within pouch 90 which can then be closed with zipper 92. Handles 14 and 16 can be detached by utilizing quick release buckles. Both the handles 14 and 16, the shoulder strap 18, and straps 20 and 22 are preferably formed of a durable padded fabric, such as nylon.

Figure 1:
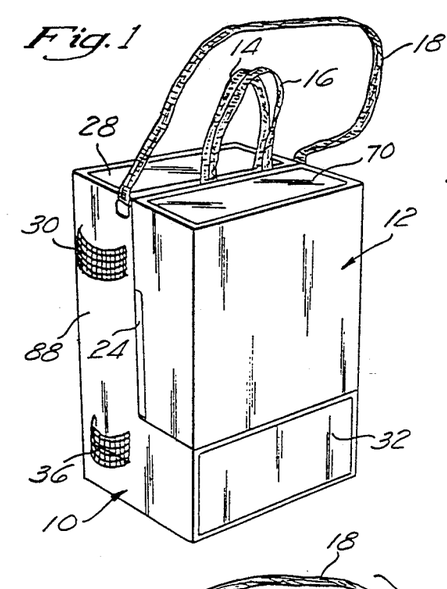
FIG. 1 is a perspective view of the first embodiment of infant care bag of the present invention.
Figure 2:
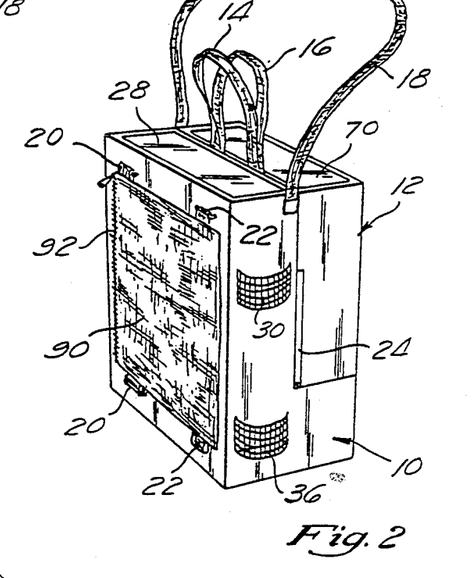
FIG. 2 is a perspective view of the infant care bag of FIG. 1 rotated approximately 90° degrees about its vertical axis.
Figure 3:
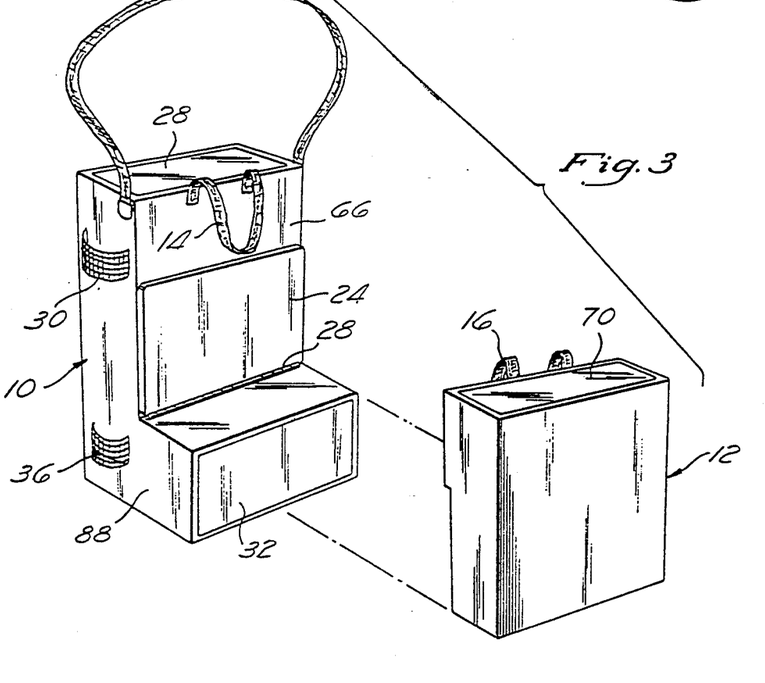
FIG. 3 is a perspective view of the infant care bag of FIG. 1 showing the removable auxiliary bag section detached from the primary bag section.

As shown in FIG. 3, the removable auxiliary bag section 12 may be detached from the primary bag section 10 to which it is secured with an attachment means such as hook and loop fasteners.

Detaching the removable auxiliary bag section 12 from the primary bag section 10 permits the user to carry either section alone depending upon the specific needs of the occasion. The primary bag section 10 has a larger storage capacity and also has the provision for cooling beverage and food items. In addition, it can also be used as a booster seat for the infant at meal time. The removable auxiliary bag section 12 is considerably smaller and lighter in weight, thereby making it more convenient when the quantity of supplies required is smaller. For instance, the primary bag section 10 alone may be most useful for infant feeding applications where a larger variety of infant care supplies are required and a booster seat is useful. The removable auxiliary bag section 12, on the other hand, might be most useful for a short trip to the market or when used as a handbag. A changing pad 26 stored within the removable auxiliary bag section 12 provides a convenient surface upon which the infant's diaper may be changed and the infant may be cleaned. An extended excursion is best accommodated by the combination of the primary bag section 10 and the removable auxiliary bat section 12, thus providing the maximum capacity of the infant care bag and also providing a useful combination for both feeding and changing the infant.

Figures 7, 8, 9, 10:
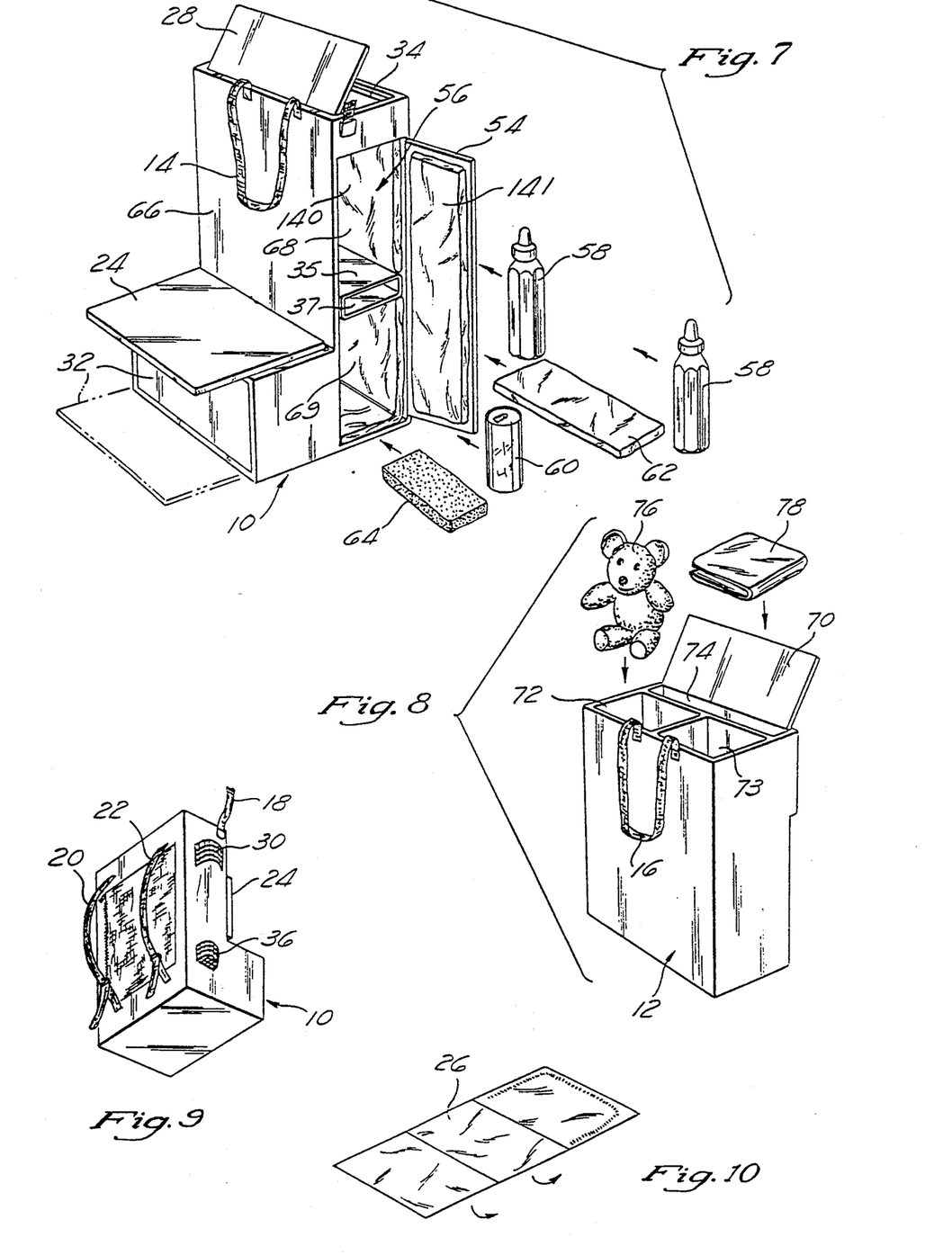
FIG. 7 is a perspective view of the primary bag section of the infant care bag of the first embodiment showing the cooler compartment and representative supplies that may be stored therein, and also showing the booster seat disposed in an operative position.
FIG. 8 is a perspective view of the removable auxiliary bag section of the infant care bag of the first embodiment showing the three compartments formed therein.
FIG. 9 is a perspective view of the primary bag section of the infant care bag of FIG. 1 configured for use as a backpack and having the removable auxiliary bag section detached.
FIG. 10 is a perspective view of the changing pad disposed in an unfolded or operative position.

A seat 24 pivotally connected to the primary bag section 10 by a hinge 28, has a storably disposed position as shown in FIG. 3 and an operably disposed position as shown in FIG. 7. Attachment means, such as hook and loop fasteners, secure the seat 24 against the back panel 66 in its stowably disposed position.

Figure 4:
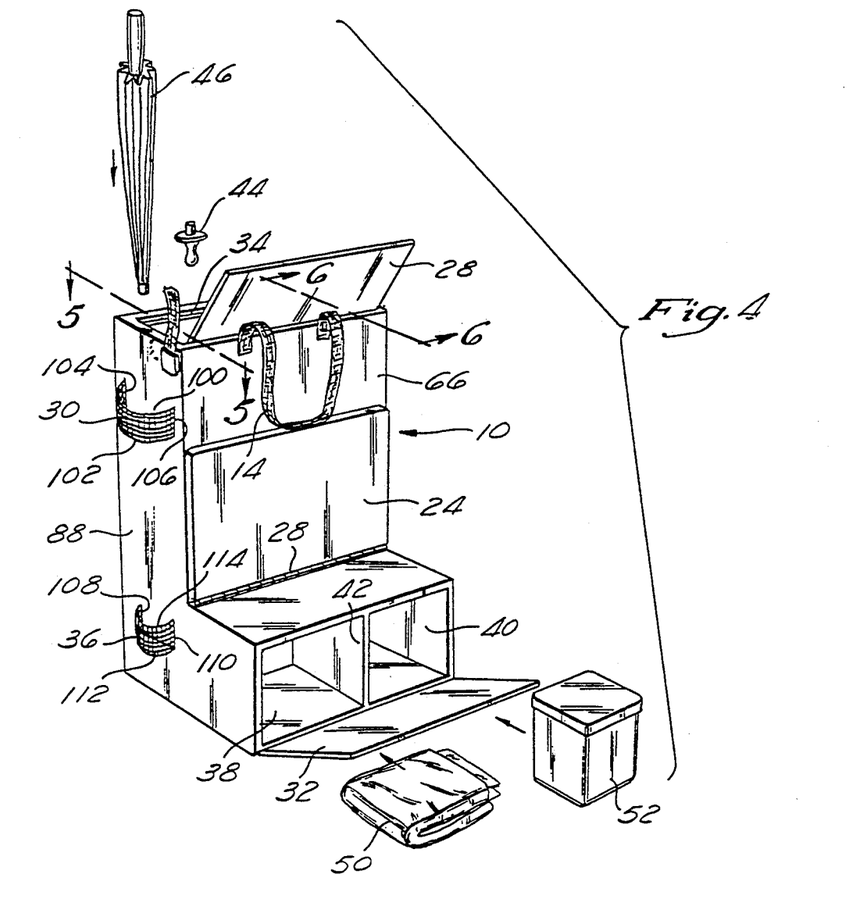
FIG. 4 is a perspective view of the primary bag section of FIG. 3 showing the doors in an open disposition and also showing representative supplies which may be stored within the compartments thereof.

Referring now to FIG. 4, the primary bag section 10 is shown having its top 28 and rear 32 doors open. Opening the top door 28 reveals the top compartment 34. Opening the rear door 32 reveals the first 38 and second 40 rear compartments. The first 38 rear compartment is specifically sized to receive four to eight disposable diapers such as Huggies (registered trademark of Kimberly-Clark). The second 40 rear compartment is specifically sized to receive a single standard sized container of Baby. Fresh pre-moistened tissues. A partition 42 separates the first 38 and second 40 rear compartments. The standard sized container has a height of approximately 6 inches, a width of approximately 5 inches and a depth of approximately 5 inches.

Figure 5:
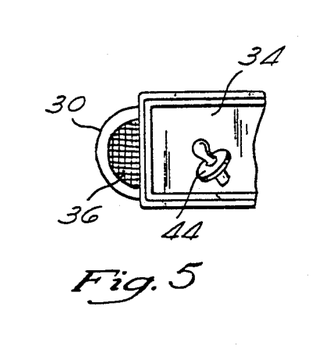

The top compartment 34 is relatively shallow, having a depth of approximately two inches, and is used to store small miscellaneous items, such as the bottle nipples and pacifiers 44. An upper webbing 30 and a lower webbing 36 are attached to left panel 88 of the primary bag section 10. The upper webbing 30 is attached to the left panel 10 along its left 104 and right 106 edges such that an elongate object, i.e. an umbrella, may be passed between the web 30 and the left panel 88 by inserting the elongate object under the web 30 at its upper horizontal edge 100 and forcing the elongate object downward until it appears from the lower 102 horizontal edge of the webbing 30. The lower webbing 36 is attached to the left panel 88 of the primary bag section 10 at its left 108 and right 110 edges and bottom 112. The top 114 edge of the webbing 36 is not secured to the left panel 88 of the primary bag section 10 such that the elongate object disposed intermediate the upper webbing 30 and the left panel 88 can be manually forced into the pocket formed by the lower webbing 36 and the left panel 88. The upper 30 and lower 36 webbing define a convenient storage means wherein an umbrella may be placed and yet remain readily accessible. The umbrella can be placed in the storage means while wet, and then permitted to dry while being stowed. The upper 30 and lower 36 webbing permit the free circulation of air about the umbrella to facilitate rapid drying and prevent the formation of mold or mildew.

Referring now to FIG. 7, the right door 54 is open to reveal the cooler compartment 56. The cooler compartment 56 is comprised of two smaller compartments 68 and 69 into which such items as baby bottles 58, soft drinks 60, and other perishable food items may be placed. An ice substitute 62 may be placed into cavity 37 of shelf 35 to chill the cooler compartment and maintain its temperature at a level suitable for the storage of perishable food items. A cold pack, such as Coldpak (a trademark of Cold Ice) product number 24PB manufactured by Cold Ice may be used. A sponge 64 may be placed in the bottom of the cooler section 56 to absorb moisture which results from condensation inside the cooler compartment 56.

The seat 24, which permits the primary bag section 10 to be used as a booster seat for feeding an infant is shown in FIG. 7 in the operably disposed position. The seat 24 is shown in FIG. 4 in the storably disposed position. Hook and loop fasteners secure the seat 24 in the stowably disposed position. The seat 24 is used by simply detaching the removable auxiliary bag section 12, if installed, and rotating the seat 24 from the storably disposed position to operably disposed position. The primary bag section 10 is then placed upon a chair and the infant is placed upon the seat 24.

Referring now to FIG. 8, the removable auxiliary bag section 12 of the infant care bag is depicted. The removable auxiliary bag section 12 can be used alone as a handbag. It is ideal for situations where it is expected that the infant will need to have its diaper changed but where feeding is not necessary. The removable auxiliary bag section has a top door 70 and three compartments 72, 73, and 74, each of which extend the full height of the removable auxiliary bag section 12. Various items, such as a child's stuffed bear 76 and a wash cloth 78, for example, can be stored in the first 72 and second 73 compartments of the removable auxiliary bag section 12. A changing pad 26 may be stored in compartment 73 which specifically sized to receive a changing pad. Compartment 73 has a depth of 8 to 20 inches, a length of 8 to 20 inches, and a width of 0.5 to 4 inches. The removable auxiliary bag section 12 can be used independently of the pack section 10 to store and transport infant care supplies. Handle 16 can be used to carry the removable auxiliary bag section 12.

The changing pad 26 can be removed from compartment 73 as needed and then unfolded, as shown in FIG. 10, to form a clean, soft surface upon which an infant's diaper may be changed.

As depicted in FIG. 9, the primary bag section 10 may be used without the removable auxiliary bag section 12. First 20 and second 22 adjustable straps may be used to carry the primary bag section upon the user's back in the same manner that a common backpack is carried. The primary bag section 10 is best used alone for medium length excursions of up to six hours in duration. The primary bag section 10 simplifies the feeding process by providing a booster chair and a cooler in which the infant's formula and other food items may be stored.

The infant care bag of the first embodiment can be fabricated by covering an extruded plastic framework with a fabric such as nylon or vinyl. The use of a fabric covering makes the infant care bag aesthetically appealing and facilitates its easy and convenient cleaning.

Figure 6:
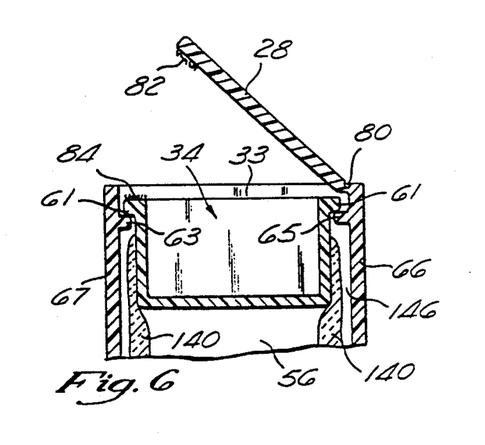
FIG. 6 is an enlarged cross-sectional view of the door of the top compartment of FIG. 4 showing the construction of the door hinge and the hook and loop latch.

As depicted in FIG. 6, the vinyl or fabric covering is used to form a hinge 80 for the door 28 to compartment 34. First 82 and second 84 hook and loop fastening members form a latch which secures the door 30 in a closed position. Each of the doors of the infant care bag may be attached and secured in this manner.

A shelf 33 is disposed within the upper compartment 34. The shelf 33 has a lip 61 which rests upon corresponding lips 63 and 65 formed upon the front 67 and rear 66 panels of the primary bag section 10. A curtain 140 is attached to and hangs from the shelf 33.

The curtain insulates the cooler compartment 56 and is more thoroughly described with respect to the second embodiment below. An air gap 146 formed between the curtain 140 and the walls of the cooler compartment 56 and in insulating the contents of the cooler compartment 56 to form the environment.

FIGS. 11, 12, 12A and 13 illustrate a second preferred embodiment of the infant care bag. This second embodiment is constructed by the vacuum forming of plastic sheets. The second embodiment has a restraining strap 96A to secure the infant upon the booster seat 24A. The booster seat 24A is attached to the primary bag section 10A with strap hinges 28A. A buckle 98A removably attaches to the restraining strap 96A to the booster seat 24A. The buckle 98A is used to detach the restraining strap 96A when placing the infant upon the booster seat 24A and when removing the infant from the booster seat 24A. Hook and loop fasteners 120A, 122A and 124A removably attach the removable auxiliary bag section 12A to the primary bag section 10A. Each of the doors, 28A, 32A and 54A are removably attached to the infant care bag using zippers 126A, 128A and 130A respectively.

Figures 11, 12, 12A:
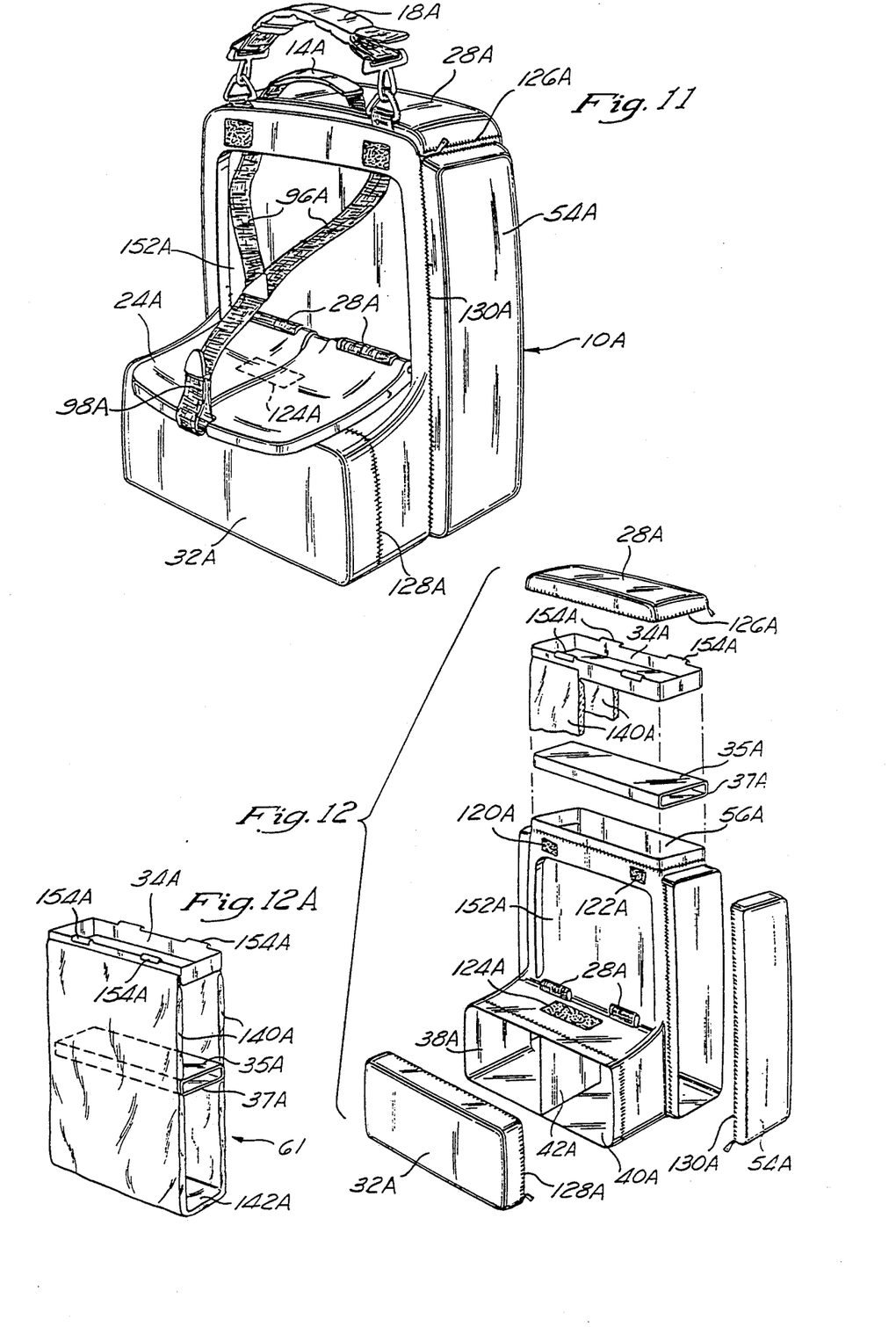
FIG. 11 is a perspective view of the primary bag section of a second embodiment of the present invention showing the booster seat disposed in an operative position.
FIG. 12 is an exploded perspective view of the primary bag section of FIG. 11.
FIG. 12A is a perspective view of the removable portion of the cooler compartment.
Figure 13:
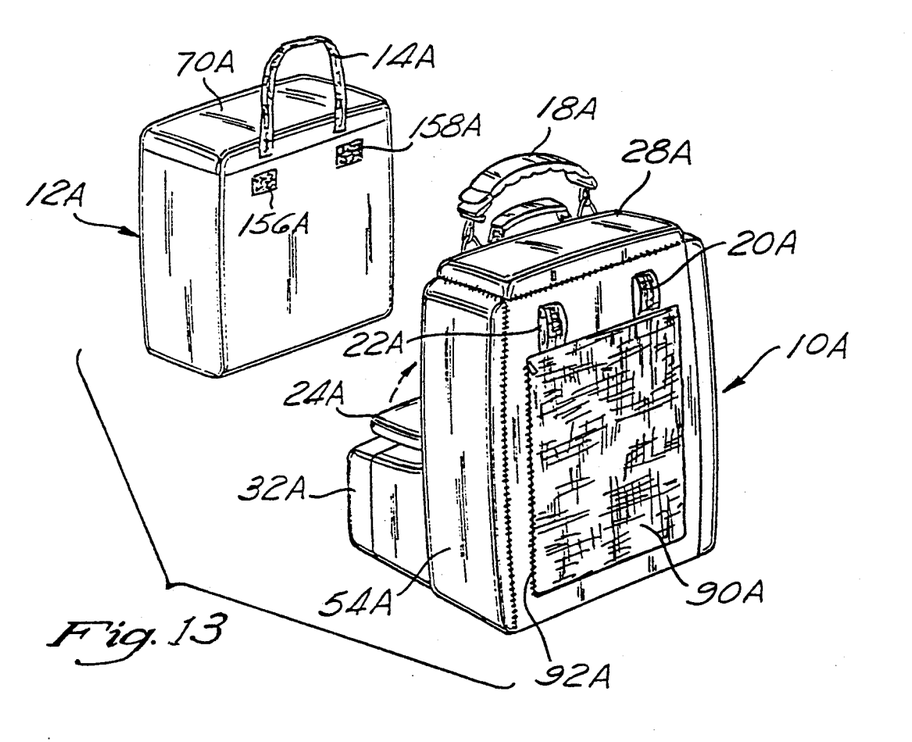
FIG. 13 is a perspective view of the second embodiment of the present invention showing the removable auxiliary section detached from the primary section.

As shown in FIG. 12, the internal shelves 34A and 35A can be removed from the primary bag 10A for cleaning. The shelves 34A and 35A, along with insulating curtain 140A, best shown in FIG. 12A, can be cleaned together using a common household dishwashing machine. Tabs 154A rest upon a lip formed within the upper compartment 34A and support both the upper shelf 33A and the curtain 140A. When the shelves 34A and 35A are installed within the cooler compartment 56A, the cooler compartment 56A is completely insulated from its ambient environment by the insulating curtain 140A. The insulating curtain 140A extends cross the lower surface of tray 34A and also has a floor 142A. A portion of the insulating curtain not shown is similarly disposed along the inner surface of cooler door 54A. Therefore, the entire contents of the cooler compartment 56A are thermally insulated from the environment.

Both the primary bag section and the removable auxiliary bag section of the infant care bag can be used to carry and store non-infant care related supplies, such as camera or video equipment. The removable auxiliary bag section is ideal for use as a handbag. The primary bag section can be used for picnics and other day outings. Therefore, the infant care bag remains a useful product even after the infant matures and infant care items are no longer needed.

It is understood that the exemplary infant care bag described herein and shown in the drawings represents only a presently preferred embodiment of the invention. Indeed, various modifications and additions may be made to such embodiment without departing from the spirit and scope of the invention. For example, the size, shape, and configuration of the infant care bag can be varied considerably. The precise location of the compartments and the nature of the items stored therein is not considered crucial to this invention. Also, various other materials may be found to be suitable for the fabrication of the infant care bag. Thus, these and other modifications and additions may be obvious to those skilled in the art and may be implemented to adapt the present invention for use in a variety of applications.

What is claimed is:

1. A bag comprising:
   (a) a rigid primary bag section comprising a cooler compartment, said cooler compartment having an inner surface;
   (b) a secondary bag section attachable to said primary bag section such that a plurality of closable compartments are provided;
   (c) a flexible curtain substantially disposed about the inner surface of said cooler compartment; and
   (d) wherein removal of said secondary bag section from said primary bag section results in said primary bag section defining a seat having a weight support surface and a backrest.

2. The bag as recited in claim 1 further comprising:
   (a) at least one shelf disposed within said cooler compartment and attached to said flexible curtain; and
   (b) wherein said at least one shelf and said flexible curtain define a removable unit for facilitating the easy cleaning of said cooler compartment.

3. The bag as recited in claim 2 further comprising a seat member rotatably attached to said primary bag section such that said seat member has a stowably disposed position in which said seat member is generally laminarly juxtaposed to said backrest when said secondary bag section is attached to said primary bag section and said seat member has an operably disposed position in which said seat member is generally laminarly juxtaposed to said weight support surface to provide a surface upon which a person may sit.

4. A bag comprising:
   (a) a primary bag section;
   (b) a secondary bag section attachable to said primary bag section;
   (c) wherein attachment of said secondary bag section to said primary bag section provides a plurality of closable compartments;
   (d) wherein removal of said secondary bag section from said primary bag section results in said primary bag section defining a seat having a weight support surface and a backrest;
   (e) a seat member rotatably attached to said primary bag section such that said seat member has a stowably disposed position in which said seat member is generally laminarly juxtaposed to said backrest when said secondary bag section is attached to said primary bag section and said seat member has an operably disposed position in which said seat member is generally laminarly juxtaposed to said weight support surface to provide a surface upon which a person may sit.

5. A bag comprising:
   (a) a primary bag section having a cooler compartment, said cooler compartment having an inner surface;
   (b) a secondary bag section attachable to said primary bag section;
   (c) wherein attachment of said secondary bag section to said primary bag section provides a plurality of closable compartments; and
   (d) wherein removal of said secondary bag section from said primary bag section results in said primary bag section defining a seat having a weight support surface and a backrest.

6. The bag as recited in claim 5 wherein said cooler compartment further comprises a flexible curtain substantially disposed about the inner surface of said cooler compartment.

7. The bag as recited in claim 6 further comprising:
   (a) at least one shelf disposed within said cooler compartment and attached to said flexible curtain; and
   (b) wherein said at least one shelf and said flexible curtain define a removable unit for facilitating the easy cleaning of said cooler compartment.

8. A bag comprising:
   (a) a primary bag section comprising a cooler compartment, said cooler compartment having an inner surface;
   (b) a secondary bag section attachable to said primary bag section such that a plurality of closable compartments are provided;
   (c) a flexible curtain substantially disposed about the inner surface of said cooler compartment;
   (d) at least one shelf disposed within said cooler compartment and attached to said flexible curtain;
   (e) wherein said at least one shelf and said flexible curtain define a removable unit for facilitating the easy cleaning of said cooler compartment; and
   (f) wherein removal of said secondary bag section from said primary bag section results in said primary bag section defining a seat having a weight support surface and a backrest.

9. The bag as recited in claim 8 further comprising a seat member rotatably attached to said primary bag section such that said seat member has a stowably disposed position in which said seat member is generally laminarly juxtaposed to said backrest when said secondary bag section is attached to said primary bag section and said seat member has an operably disposed position in which said seat member is generally laminarly juxtaposed to said weight support surface to provide a surface upon which a person may sit.

10. A bag comprising:
    (a) a primary bag section;
    (b) a secondary bag section attachable to said primary bag section;
    (c) wherein attachment of said secondary bag section to said primary bag section provides a plurality of closeable compartments;
    (d) a seat member rotatably attached to said primary bag section such that said seat member has a stowably disposed position in which said seat member is generally laminarly juxtaposed to said backrest when said secondary bag section is attached to said primary bag section and said seat member has an operably disposed position in which said seat member is generally laminarly juxtaposed to said weight support surface to provide a surface upon which a person may sit; and
    (e) wherein removal of said secondary bag section from said primary bag section results in said primary bag section defining a seat having a weight support surface and a backrest, said weight support surface having sufficient structural strength to support the weight of an infant.

11. A bag comprising:
    (a) a primary bag section;
    (b) a secondary bag section attachable to said primary bag section;
    (c) wherein attachment of said secondary bag section to said primary bag section provides a plurality of closable compartments;
    (d) said primary bag section further comprising a cooler compartment, said cooler compartment having an inner surface and (e) wherein removal of said secondary bag section from said primary bag section results in said primary bag section defining a seat having a weight support surface and a backrest, said weight support surface having sufficient structural strength to support the weight of an infant.

12. The bag as recited in claim 11 wherein said cooler compartment further comprises a flexible curtain substantially disposed about the inner surface of said cooler compartment.

13. The bag as recited in claim 12 further comprising:
  (a) at least one shelf disposed within said cooler compartment and attached to said flexible curtain; and
  (b) wherein said at least one shelf and said flexible curtain define a removable unit for facilitating the easy cleaning of said cooler compartment.

* * * * *